United States Patent Office 3,424,608
Patented Jan. 28, 1969

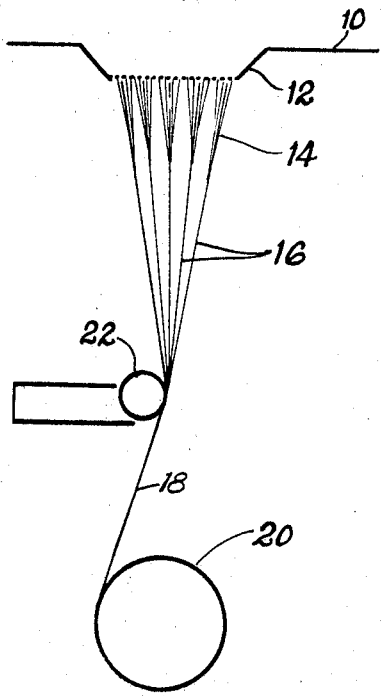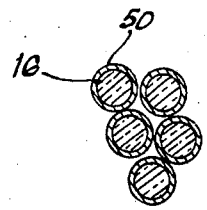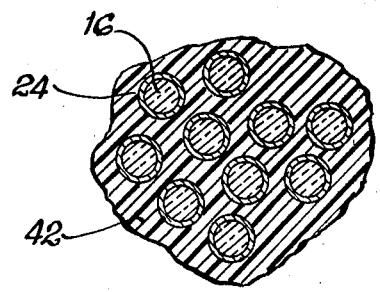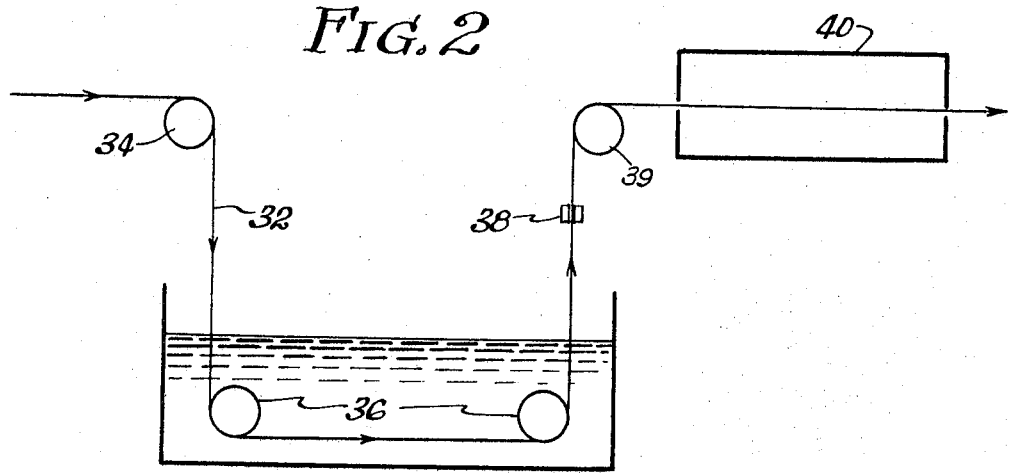

3,424,608
GLASS FIBER REINFORCED ELASTOMERS
Alfred Marzocchi, Cumberland, R.I., and Albert E. Tamosauskas, Ben Avon, Pa., assignors to Owens-Corning Fiberglas Corporation, a corporation of Delaware
Continuation of applications Ser. No. 400,517, Sept. 30, 1964 and Ser. No. 494,654, Oct. 11, 1965. This application Mar. 22, 1967, Ser. No. 633,654
U.S. Cl. 117—72                                    6 Claims
Int. Cl. B44d 1/14; C03c 25/00; C09 11/08

ABSTRACT OF THE DISCLOSURE

This invention is addressed to the preparation of glass fiber bundles for use as a reinforcement or in other combinations with elastomeric material wherein the glass fibers of the bundle are sized or the bundle of glass fibers is impregnated with a composition formulated of a resorcinol formaldehyde resin, a vinyl pyridine terpolymer, neoprene rubber and butadiene rubber with the elastomeric components present in the form of a latex.

---

This is a continuation of our copending application Ser. No. 400,517, filed Sept. 30, 1964 and now abandoned, and entitled, "Glass Fiber Reinforced Elastomers," and Ser. No. 494,654, filed Oct. 11, 1965, and entitled, "Glass Fiber Size Composition and Products."

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of stands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molted products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which—

FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

FIG. 2 is a flow diagram illustrating the treatment of glass fibers subsequent to their being formed into bundles, strands, yarns, cords or fabrics to impregnate the glass fiber bundles in accordance with the preferred practice of this invention;

FIG. 3 is a cross-sectional view of glass fibers processed in accordance with the diagram illustrated in FIG. 1; and FIG. 4 is a cross-sectional view of a bundle of glass fibers processed in accordance with the flow diagram of FIG. 2.

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The invention will be described with reference to a new and improved composition which can be employed as an original size applied to the glass fibers in forming thereby individually to coat each of the glass fiber filaments subsequently formed into the strand, yarn, cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber-elastomeric products.

The following examples will serve to illustrate the principal concepts of this invention in a composition and method for the treatment, as by impregnation, of bundles, yarns, cords and fabrics of glass fibers wherein the fibers have previously been sized in forming with a conventional size composition which has preferably been modified to embody a glass fiber anchoring agent.

EXAMPLE 1

Forming size composition

| | Percent by weight |
|---|---|
| Partially dextrinized starch | 8.0 |
| Hydrogenated vegetable oil | 1.8 |
| Cationic wetting agent (lauryl amine acetate) | 0.4 |
| Nonionic emulsifying agent | 0.2 |
| Gamma-amiopropyltriethoxy silane | 1.0 |
| Water | 88.6 |

EXAMPLE 2

Forming size composition

| | Percent by weight |
|---|---|
| Saturated polyester resin | 3.2 |
| Fatty acid amine wetting agent (Nopcogen 16L) | 0.1 |
| Polyvinyl alcohol | 0.1 |
| Pyrrolidine | 3.0 |
| Gamma-aminopropyltriethoxy silane | 0.3 |
| Glacial acetic acid | 0.1 |
| Water | 93.2 |

EXAMPLE 3

Forming size composition

| | Percent by weight |
|---|---|
| Paraffin wax in aqueous emulsion | 0.2 |
| Cationic amide polyester resin | 1.3 |
| Polyglycol condensate (300 to 400 m.w.) | 2.3 |
| Gelatin | 0.25 |
| Gamma-aminopropyltriethoxy silane | 0.5 |
| Dibasic ammonium phosphate | 0.1 |
| Glacial acetic acid | 0.2 |
| Water | 95.15 |

Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying of the thin size coating can be accelerated by exposure to elevated temperature such as a temperature within the range of 150° to 250° F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads, or cords which may be used as a reinforcement for elastomeric materials, with or without cutting to shorter lengths, and which can be formed into woven or non-woven fabrics for subsequent combination with elastomeric materials.

After the fibers have been processed into strands, yarns, cords or fabrics, hereinafter referred to generally as bundles, the bundles of sized glass fibers are impregnated with a composition embodying the features of this invention, as represented by the following examples:

EXAMPLE 4

Impregnating composition

| | Parts by weight |
|---|---|
| Resorcinol-formaldehyde resin (Penacolite resin R2170—70% solids) | 2.0 |
| Formaldehyde (37% by weight solution) | 1.4 |
| Concentrated ammonium hydroxide | 5.0 |
| Vinyl pyridine terpolymer—41% solids (Gentac, General Tire & Chemical Company) | 25.0 |
| Neoprene rubber latex (50% solids) | 50.0 |
| Butadiene latex (Pliolite 2104—60% solids) | 7.4 |
| Sodium hydroxide | 0.2 |
| Water | 58.0 |

Impregnation with the aqueous composition of Example 4 can be made by way of a solvent bushing but it can also be achieved by other conventional means for impregnation, such as by immersion of the bundles of glass fibers in a bath of aqueous impregnating composition. Referring more specifically to FIG. 2 of the drawing, the glass fiber bundle 32 is advanced over a guide roller 34 for passage downwardly into the bath 35 containing the impregnating composition of Example 4. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter the endless bundle is advanced over a roller 39 into a drying oven preferably in the form of an air drying oven maintained at a temperature above ambient temperature and preferably at a temperature within the range of 150° to 350° F. to accelerate removal of the aqueous diluent and to set the impregnating material in situ in the glass fiber bundle. Drying will occur in a relatively short period of time, ranging from 1 to 30 minutes, depending somewhat upon the temperature of drying.

The resorcinol formaldehyde resin, marketed in the United States under the trade name "Penacolite Resin R2170", comprises the condensation reaction product of resorcinol and formaldehyde in the mole ratio of about 1 to 8. The vinyl pyridine terpolymer is further defined in the copending application of Marzocchi, Ser. No. 572,307, filed Aug. 15, 1966, and entitled, "Glass Fiber-Elastomeric Products and Method," as a butadiene-styrene-vinyl pyridine terpolymer of the type manufactured by General Tire & Chemical Company under the trade name "Gentac," or by the Goodyear Tire & Rubber Company under the trade name "Pliolite VP100." The amount of the ingredients of the impregnating composition may be varied within the following range:

EXAMPLE 5

| | Parts by weight |
|---|---|
| Resorcinol formaldehyde resin | 2–10 |
| Formaldehyde (37% solution) | 1–3 |
| Concentrated ammonium hydroxide | 2–5 |
| Vinyl pyridine terpolymer (42% solids) | 15–50 |
| Neoprene rubber latex (50% solids) | 25–50 |
| Butadiene latex (60% solids) | 5–15 |
| Alkali metal hydroxide | .05–0.2 |

Water is incorporated with the foregoing materials in amounts to produce an impregnating composition having a minimum solids content of 10% and a maximum solids content of about 50% by weight. Introduction should be made in an amount to impregnate with a dry solids of 5–25% by weight of the glass fiber system and preferably 10–15% by weight.

It is desirable to achieve as full impregnation as possible into the bundles of glass fibers in order more effectively to separate the fibers one from the other by the impregnating materials since the solids are effective as a coating on the sized glass fibers to cushion the fibers and to protect the fibers against destruction by mutual abrasion. Thus it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

More complete protection for the individual glass fibers and a fuller coordination with the elastomeric material in the continuous phase can be achieved when the impregnating compositions of Examples 4 and 5 are modified for treatment of the glass fibers as a size composition which can be applied to the individual glass fibers as they are formed, as illustrated in FIG. 1 of the drawing, or afterwards if the original size is removed. For this purpose, the impregnating composition of this invention should be formulated to include an anchoring agent, such as gamma-aminopropyltriethoxy silane. Instead of gamma-aminopropyltriethoxy silane, in the size or in the impregnating composition, use can be made of other organo silicon compounds in which the organic group attached to the silicon atom contains an amino group, such as gamma-aminovinyldiethoxy silane, gamma(triethoxysilylpropylamide) propylamine, N(gamma - triethoxysilylpropyl)propylamine, beta - aminoallyltriethoxy silane, and para-aminophenyltriethoxy silane. Use can be made of other organo silicon compounds in the form of a silane, silanol or polysiloxane in which the organic group attached to the silicon atom contains an epoxy group, such as glycydoxypropyltrimethoxy silane or 3,4-epoxycyclohexylethyltrimethoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, β-alanine chromic complex, or glycylate chromic chloride.

A forming size embodying the further concepts of this invention can be formulated as follows:

EXAMPLE 6

| | Parts by weight |
|---|---|
| Resorcinol formaldehyde resin | 2–10 |
| Formaldehyde (37% solution) | 1–3 |
| Concentrated ammonium hydroxide | 2–5 |
| Vinylpyridine terpolymer (42% solids) | 15–50 |
| Neoprene rubber latex (50% solids) | 25–50 |
| Butadiene latex (60% solids) | 5–15 |
| Alkali metal hydroxide | .05–0.2 |
| Anchoring agent | 0.1–3.0 |

To the foregoing, water is added to form an aqueous dispersion in an amount to provide for a solids content within the range of 20–45% by weight. Application should be made in an amount to deposit a dry solids of 7–20% by weight of the sized glass fibers.

EXAMPLE 7

| | Parts by weight |
|---|---|
| Resorcinol formaldehyde resin | 2.0 |
| Formaldehyde (37% solution) | 1.0 |
| Concentrated ammonium hydroxide | 2.7 |
| Vinyl pyridine terpolymer latex (42% solids) | 25.0 |
| Neoprene rubber latex (50% solids) | 41.0 |
| Butadiene latex (60% solids) | 5.0 |
| Sodium hydroxide | .05 |
| Gamma-aminopropyltriethoxy silane | 1.0 |
| Water | 1100 |

In the size compositions of Examples 6 or 7, the anchoring agent can be employed in an amount within the range of 0.1 to 3.0% by weight of the size composition and preferably 0.1 to 1.0% by weight.

When the glass fibers are sized in forming with a composition embodying the features of this invention, the sized fibers can be processed directly into sized yarns, strands, cords or fabrics, or used alone in combination with elastomeric materials without the need for impregnation of the bundles of glass fibers since individual fibers 16 of the bundle are already provided with a coating 50 (FIG. 3) formulated to contain the desired components for anchoring the elastimeric material and for protecting the glass fibers to enhance their processing and their performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber-elastomeric product.

It will be understood that the size compositions, represented by Examples 6 and 7, may also be employed as impregnating compositions, preferably with lesser dilution with aqueous medium, since the anchoring agent embodied in the size composition will continue to operate as an anchoring agent further to facilitate the bonding relationship or integration between the elastomeric material of the continuous phase and the treated glass fibers.

It will be apparent that we have provided a new and improved composition for use in the treatment of glass fibers and bundles of glass fibers to enhance their integration with elastomeric materials in the manufacture of glass fiber-elastomeric products.

It will be understood that invention exists not only in the composition for use in the treatment of the glass fibers to prepare the glass fibers for combinations with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

We claim:

1. A glass fiber bundle, a thin size coating on the surfaces of the glass fibers in the bundle and an impregnant in the bundle of glass fibers in which the impregnant consists essentially of the combination of resorcinol formaldehyde resin having a resorcinol to formaldehyde weight ratio of about 1 to 2, vinyl pyridine terpolymer rubber, neoprene rubber, and butadiene rubber, present in the ratio of 6 to 20 parts by weight vinyl pyridine terpolymer rubber, 12.5 to 25 parts by weight neoprene rubber and 3 to 9 parts by weight butadiene rubber, and 2 to 10 parts by weight of resorcinol formaldehyde resin.

2. An elastomeric product comprising a continuous phase of elastomeric material and glass fiber bundles distributed throughout the continuous phase of the elastomeric material, in which the glass fiber bundles are impregnated with a composition to enhance their bonding relationship between the continuous phase of the elastomeric material and the glass fiber bundles in which the impregnant consists essentially of the combination of resorcinol formaldehyde resin having a resorcinol to formaldehyde weight ratio of about 1 to 2, vinyl pyridine terpolymer rubber, neoprene rubber and butadiene rubber, present in the ratio of 6 to 20 parts by weight vinyl pyridine terpolymer rubber, 12.5 to 25 parts by weight neoprene rubber and 3 to 9 parts by weight butadiene rubber, and 2 to 10 parts by weight of resorcinol formaldehyde resin.

3. Glass fibers and a size present as a thin coating on the glass fiber surfaces in which the size coating consists essentially of the combination of a resorcinol formaldehyde resin having a resorcinol to formaldehyde weight ratio of about 1 to 2, vinyl pyridine terpolymer rubber, neoprene rubber, butadiene rubber and an anchoring agent selected from the group consisting of an organo silicon compound and a Werner complex compound in which the organic group attached to the silicon atom of the organo silicon compound and in which the carboxylato group coordinated with the chromium atom of the Werner complex compound contains a group selected from the group consisting of an amino group and an epoxy group in which the materials are present in the ratio of 2 to 10 parts by weight resorcinol formaldehyde resin, 6–20 parts by weight vinyl pyridine terpolymer rubber, 1.25 to 25 parts by weight neoprene rubber, and 0.1 to 3.0 parts by weight of the anchoring agent.

4. Sized glass fibers as claimed in claim 3 in which the anchoring agent is gamma-aminopropyltriethoxy silane.

5. An elastomeric product comprising an elastomeric material as a continuous phase and glass fibers distributed throughout the continuous phase in which the glass fibers have a thin size coating on the glass fiber surfaces to enhance the bonding relationship between the glass fibers and the elastomeric materials, said size coating consisting essentially of the combination of a resorcinol formaldehyde resin having a resorcinol to formaldehyde weight ratio of about 1 to 2, vinyl pyridine terpolymer rubber, neoprene rubber, butadiene rubber and an anchoring agent selected from the group consisting of an organo silicon compound and a Werner complex compound in which the organic group attached to the silicon atom of the organo silicon compound and in which the carboxylato group coordinated with the chromium atom of the Werner complex compound contains a group selected from the group consisting of an amino group and an epoxy group in which the materials are present in the thin size coating in the ratio of 2 to 10 parts by weight resorcinol formaldehyde resin, 6 to 20 parts by weight vinyl pyridine terpolymer rubber, 12.5 to 25 parts by weight neoprene rubber, 3 to 9 parts by weight butadiene rubber, and 0.01 to 3.0 parts by weight of the anchoring agent.

6. An elastomeric product as claimed in claim 5 in which the anchoring agent is gamma-aminopropyltriethoxy silane.

References Cited

UNITED STATES PATENTS

| | | | |
|---|---|---|---|
| 3,168,389 | 2/1965 | Eilerman | 117—126 X |
| 3,190,764 | 6/1965 | Cardina | 117—72 |
| 3,194,294 | 7/1965 | Van Gils | 152—330 |
| 3,307,967 | 3/1967 | Vanderbilt et al. | 117—126 X |
| 3,330,689 | 7/1967 | Ells et al. | 117—126 X |
| 3,350,345 | 10/1967 | Vanderbilt et al. | 117—126 X |
| 3,367,793 | 2/1968 | Atwell | 117—163 X |

RALPH S. KENDALL, *Primary Examiner.*

HERBERT COHEN, *Assistant Examiner.*

U.S. Cl. X.R.

117—126, 163, 77; 260—29.3